(12) United States Patent
Tani

(10) Patent No.: US 7,286,542 B2
(45) Date of Patent: Oct. 23, 2007

(54) MOBILE COMMUNICATION NETWORK SYSTEM, FOREIGN AGENT ROUTER, ADDRESS SERVER AND PACKET DELIVERY METHOD EMPLOYED THEREIN

(75) Inventor: Hideaki Tani, Tokyo (JP)

(73) Assignee: NEC Corporation (JP)

( * ) Notice: Subject to any disclaimer, the term of this patent is extended or adjusted under 35 U.S.C. 154(b) by 1015 days.

(21) Appl. No.: 10/412,815

(22) Filed: Apr. 11, 2003

(65) Prior Publication Data

US 2003/0198192 A1    Oct. 23, 2003

(30) Foreign Application Priority Data

Apr. 18, 2002    (JP)    ............................ 2002-115572

(51) Int. Cl.
*H04L 12/56*    (2006.01)
(52) U.S. Cl. ............................... 370/395.54; 370/395.2
(58) Field of Classification Search ............ 370/395.54
See application file for complete search history.

(56) References Cited

U.S. PATENT DOCUMENTS 6,831,918 B1 * 12/2004 Kavak ................... 370/395.52

| | | | |
|---|---|---|---|
| 6,922,404 B1 * | 7/2005 | Narayanan et al. | 370/338 |
| 6,973,088 B2 * | 12/2005 | Kuzhiyil et al. | 370/395.2 |
| 7,020,120 B2 * | 3/2006 | Inoue et al. | 370/338 |
| 7,158,513 B2 * | 1/2007 | Wada et al. | 370/389 |

OTHER PUBLICATIONS

C. Perkins, Editor, IBM, *RCF (Request for Comments) 2002 of IETF (Internet Engineering Task Force)*, Oct. 1996, pp. 1-79.

* cited by examiner

*Primary Examiner*—Hassan Kizou
*Assistant Examiner*—Jay P. Patel
(74) *Attorney, Agent, or Firm*—Ostrolenk, Faber, Gerb & Soffen, LLP

(57) ABSTRACT

A mobile communication network system is capable of achieving both of route optimizing function and demand for privacy protection. An address server determines network addresses to be assigned for a plurality of variable IP subnetworks and use period of the network addresses, and distributes network addresses to routers having foreign agent function in the variable IP subnetworks. When use period of the assigned network address expires, new network address of own router is at first assigned. Addition of the subnetwork having new network address is notified to respective routers of the fixed IP subnetworks using IP route control means.

18 Claims, 7 Drawing Sheets

MOBILE COMMUNICATION NETWORK SYSTEM, FOREIGN AGENT ROUTER, ADDRESS SERVER AND PACKET DELIVERY METHOD EMPLOYED THEREIN

CROSS REFERENCE TO THE RELATED APPLICATION

The present application has been filed with claiming priority based on Japanese Patent Application No. 2002-115572, filed on Apr. 18, 2002. Disclosure of the above-identified Japanese Patent Application is herein incorporated by reference.

BACKGROUND OF THE INVENTION

1. Field of the Invention

The present invention relates to a mobile communication network system, a foreign agent router, an address server and a packet delivery method employed therein. More particularly, the invention relates to a network system consisted of fixed IP (Internet Protocol) subnetworks.

2. Description of Related Art

Conventionally, in a network system consisted of fixed IP subnetworks of this kind, when mobile IP [Mobile IP (ver. 4)] is made use of, there are following two kinds of arrangement configuration as arrangement configuration of home agents performing position management of IP terminal (mobile nodes).

The first arrangement configuration is a configuration frequently used in a local area network (LAN) or the like. In this configuration, a mobile IP compatible router is arranged in a desktop LAN, such as Ethernet (trademark) or the like. The router serves as a home agent including IP terminals belonging in the subnetworks and as a foreign agent for external IP terminals roaming to the subnetwork.

The second arrangement configuration is a configuration to adapt a virtual subnetwork, namely a subnetwork actually having no belonging terminal to deal a mobile IP terminal as moving outside irrespective of the position thereof so that the home agent transmits packets to the subnetwork where the mobile IP terminal is present. In this case, the home agent may be arranged anywhere. However, it is efficient to arrange the home agent in the vicinity of a gateway connected to external network.

In this case, in the second arrangement configuration, as shown in FIG. 6, when the mobile IP terminal [mobile node (MN)] 13 connected to the home agent (HA) 11 through a home link 101 moves to be connected to the foreign agent (FA) 12 via an external link 102, the home agent 11 transfers the packet from a communication counterpart (CN) 14 to the mobile IP terminal 13, to the foreign agent 12 for delivery to the mobile IP terminal 13 from the foreign agent 12.

Here, Mobile IP (ver. 4) has been described in RFC (Request for Comments) 2002 of IETF (Internet Engineering Task Force), C. Perkins (IBM), Editor, October 1996.

Basic operation of this Mobile IP (ver. 4) will be discussed hereinafter. The mobile IP terminal 13 performs agent discovery as in which of the home link 101 or the external link 102, it is included by receiving the public notice of the Agent. When the mobile IP terminal 13 makes agent discovery as being included in the home link 101, mobility service is not used.

When the mobile IP terminal 13 makes agent discovery as being included in the external link 102, an address of the foreign agent 12 or an address (co-located: second address) obtained from DHCP (Dynamic Host Configuration Protocol) is registered to the own home agent 11 as care of address. At this time, the mobile IP terminal 13 may register the care of address to the home agent 11 via the foreign agent 12. On the other hand, the mobile IP terminal 13 updates position registration to the home agent 11 upon returning from the external link 102 to the home link 101.

The packet from the communication counterpart 14 to the mobile IP terminal 13 is captured by the home agent 11, is transferred using tunnel to the care of address and is delivered to the mobile IP terminal 13 based on the care of address. The packet from the mobile IP terminal 13 to the communication counterpart 14 is basically transported by a general IP packet transporting mechanism (e.g. IP router network 100).

It has also been proposed an option of a route optimizing function performing route optimization between the communication counterpart 14 and the mobile IP terminal 13 by notifying presenting zone position (care of address) of the mobile IP terminal 13 to the communication counterpart 14 in transfer of packet from the communication counterpart 14 to the mobile IP terminal 13. It should be noted that in Mobile IP (ver. 6), as shown in FIG. 7, study has been made not as optional transfer method.

In the conventional network system set forth above, when the former transfer method via the home agent is selected, concentration of traffic to the home agent can be caused to significantly restrict throughput of the entire network system.

On the other hand, when the option using the later route optimizing function is selected, while concentration of traffic to the home agent can be avoided, since the presenting zone position of the mobile IP terminal is notified to the communication counterpart, demand for privacy protection to hide the presenting zone position of the mobile IP terminal cannot be satisfied.

SUMMARY OF THE INVENTION

Therefore, it is an object to solve the problems set forth above and to provide a mobile communication network system, a foreign agent router, an address server and a packet delivery method using therein which can achieve both of route optimizing function and protection of privacy.

According to the first aspect of the present invention, a mobile communication network system consisted of a plurality of subnetworks and applicable of mobile internet protocol, comprises:

means for randomly varying addresses of the subnetworks;

first announcement means provided in the plurality of subnetworks for announcing currently assigned addresses of respective own subnetworks to terminals included in own subnetworks; and second announcement means provided in the plurality of subnetworks for announcing currently assigned addresses of respective own subnetworks to adjacent routers, in the subnetwork, an address before variation and an address after variation being redundantly held until delivery of packets using the address before variation is completed.

According to the second aspect of the present invention, a foreign agent router arranged in each of subnetworks consisting of a mobile communication network system applicable of mobile internet protocol, comprises:

first announcement means for announcing currently assigned address of own subnetwork to terminals included in own subnetwork; and second announcement means for announcing currently assigned address of own subnetwork to adjacent router, an address before variation and an address after variation being redundantly held until delivery of packets using the address before variation is completed.

According to a third aspect of the present invention, an address server connected to any one of a plurality of fixed internet protocol subnetworks in a mobile communication network system consisted of a plurality of fixed internet protocol subnetworks and a plurality of variable internet protocol networks and applicable of mobile internet protocol, comprises:

distributing means for randomly varying and distributing network addresses of the plurality of variable internet protocol subnetworks so that network addresses before variation and network addresses after variation being redundantly held until delivery of packets using the address before variation is completed.

According to the fourth aspect of the present invention, a packet delivery method in a mobile communication network system consisted of a plurality of subnetworks and applicable of mobile internet protocol, comprises:

step of randomly varying addresses of the subnetworks;

step of announcing currently assigned addresses of respective own subnetworks to terminals included in own subnetworks; and step of announcing currently assigned addresses of respective own subnetworks to adjacent routers, in the subnetwork, an address before variation and an address after variation being redundantly held until delivery of packets using the address before variation is completed.

Namely, the mobile communication network system according to the present invention realizes optimization of route and preventing invasion of privacy by disclosing address where mobile internet protocol terminal is present on the basis of mobile IP (Internet Protocol) defined by IETF (Internet Engineering Task Force).

More particularly, the mobile communication network system according to the present invention is consisted of a plurality of fixed IP subnetworks having fixed network addresses and a plurality of variable IP subnetworks having variable network addresses. Amongst, foreign agent routers defined in the mobile IP protocol are provided in the variable IP subnetworks.

By this, in the mobile communication network system according to the present invention, by synchronizing random variation of the network addresses and the updating of the routing information in the IP network with the forgein agent router with varying the network addresses of the variable IP subnetworks in which the mobile IP terminal can temporarily present, it becomes possible to prevent reverse tracing of the physical position of the router from the network address of the subnetwork where the mobile IP terminal presents.

On the other hand, by redundantly assigning network addresses before and after variation for the router of the relevant subnetwork, non-delivery of the packet upon random variation of the network address can be prevented.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of a mobile communication network system in accordance with the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
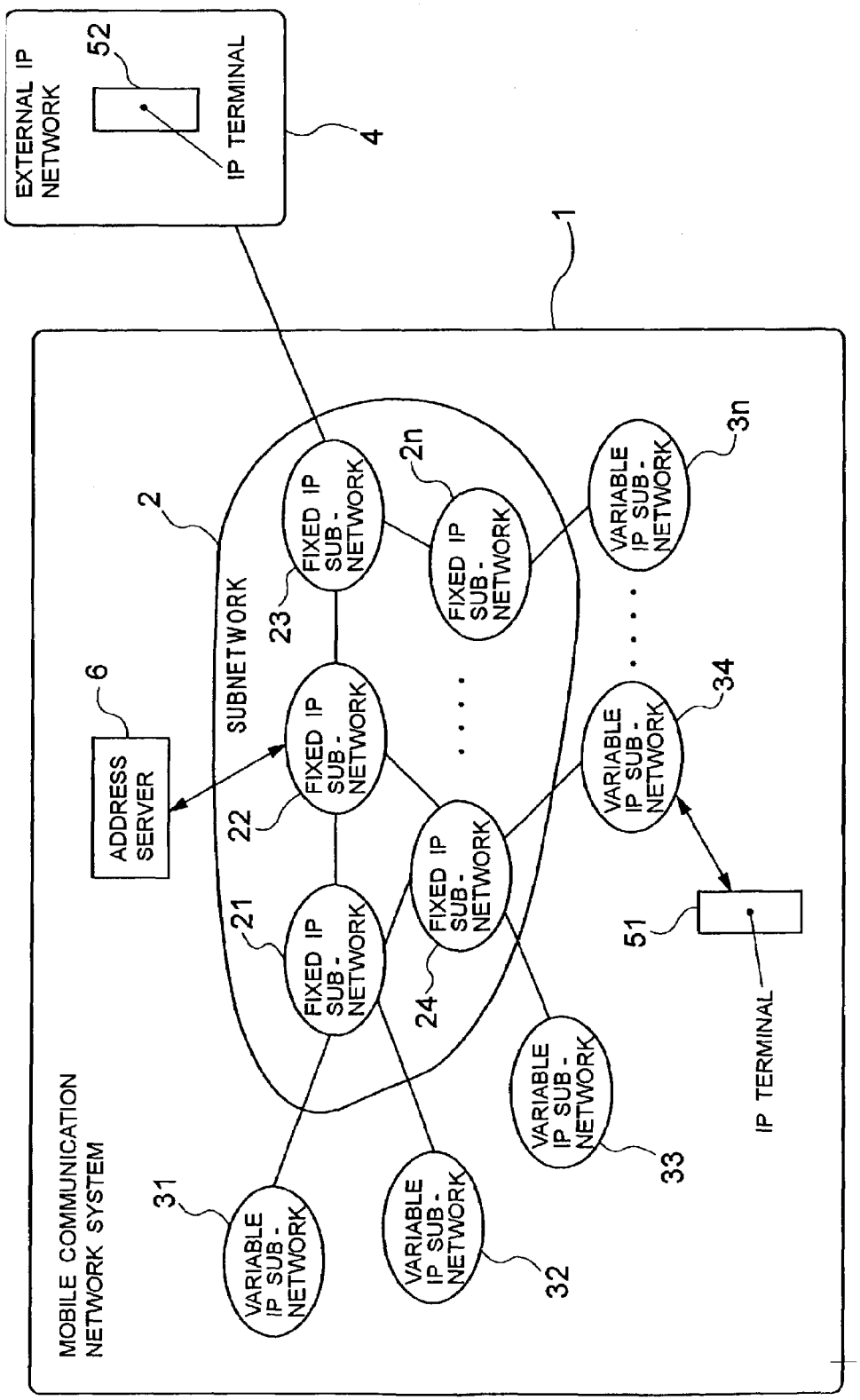
FIG. 1 is a block diagram showing a construction of one embodiment of a mobile communication network system according to the present invention.

FIG. 1 is a block diagram showing a construction of one embodiment of a mobile communication network system according to the present invention. In FIG. 1, the mobile communication network system is constructed with fixed IP (Internet protocol) subnetworks 21 to 2*n*, and variable IP subnetworks 31 to 3*n*. The fixed IP subnetworks 21 to 2*n*, in which network addresses are fixed, form a subnetwork group 2.

The fixed IP subnetwork 22 is connected to an address server 6. The fixed IP subnetwork 23 is connected to an external IP network 4. On the other hand, in the mobile communication network system 1, a mobile IP terminal 51 is present. In the external IP network 4, an IP terminal 52 is connected.

The fixed IP subnetworks 21 to 2*n* are connected so as to establish communication with each other. Among these, one or more subnetworks are connected to the external IP network 4 through transmission links. While only fixed IP subnetwork 23 is connected to the external IP network 4 in FIG. 1, it is also possible that a plurality of fixed IP subnetworks are connected to the same external IP network through the links.

The variable IP subnetworks 31 to 3*n* are connected to one or more fixed IP subnetworks, respectively. The address server 6 is connected to the fixed IP subnetwork 22. From the fixed IP subnetwork 22, communication with all of the variable IP subnetworks 31 to 3*n* can be established via other fixed IP subnetworks 21, 23 to 2*n*. In this case, the address server 6 may be connected any of the fixed IP subnetworks 21 to 2*n*.

The mobile IP terminal 51 presenting in the mobile communication network system 1 takes any one of the fixed IP subnetworks 21 to 2n as home network. It is assumed that in communicating condition, the mobile IP terminal 51 is present in any one of the variable IP subnetworks 31 to 3n (in case of FIG. 1, the variable IP subnetwork 34), and will never present in the own home network.

As embodiment of such construction, it is considered a network configuration where the fixed IP subnetworks 21 to 2n are relaying router network to which the terminal cannot be connected directly, and the variable IP subnetworks 31 to 3n are wireless LAN (Local Area Network) capable of wireless connection with the terminal.

For example, when the fixed IP subnetwork 21 is taken as home network of the mobile IP terminal 51, a corresponding home agent (not shown) is placed in the fixed IP subnetwork 21. In this case, a packet transmitted from the IP terminal 52 belonging in the external IP network 4 to the mobile IP terminal 51 is delivered to the address in the fixed IP subnetwork as recipient, after proxy reception by the home agent, and is again delivered to the subnetwork (variable IP subnetwork in FIG. 1) where the mobile IP network 51 is present, registered therein.

As shown in FIG. 1, when the mobile IP terminal 51 presents in the variable IP subnetwork 34, the home agent in the fixed IP subnetwork 21 recognizes that the mobile IP terminal 51 is present in the variable IP subnetwork 34 and transfers the arrived packet to the variable IP subnetwork 34. In this case, an IP address of the variable IP subnetwork is as temporary value assigned from the address server 6. The temporarily assigned IP address is announced to respective routers in the network, the mobile IP terminal 51 presenting in the variable IP subnetwork 34 and the IP terminal 52 as communication counterpart. By this, the IP terminal 52 as the communication counterpart may know the current IP address if the mobile IP terminal 51 to communicate.

As set forth, upon retransferring the packet addressed to the mobile IP terminal 51 to the subnetwork (variable IP subnetwork 34 of FIG. 1) where the mobile IP terminal is present, an address of foreign agent router (not shown) placed in the subnetwork where the mobile IP terminal is present, is notified to the IP terminal 52 as sender. Using the notified address, the sender IP terminal 52 directly deliver the next and subsequent packets (second and subsequent packets) to the obtained foreign agent router.

It should be noted that, in the foregoing Mobile IP (ver. 4), the foreign agent routers are arranged in all of the variable IP subnetworks 31 to 3n. However, in Mobile IP (ver. 6), the foreign agent servers are arranged in some of the variable IP subnetworks 31 to 3n and not arranged in the others. On the other hand, the foreign agent router performs detection of the mobile IP terminal presenting in the subnetwork (depending upon registration from the mobile IP terminal), reception of tunneling packet from the home agent, transfer of the packet to the mobile IP terminal and IP packet transfer similar to the typical router.

Figure 2:
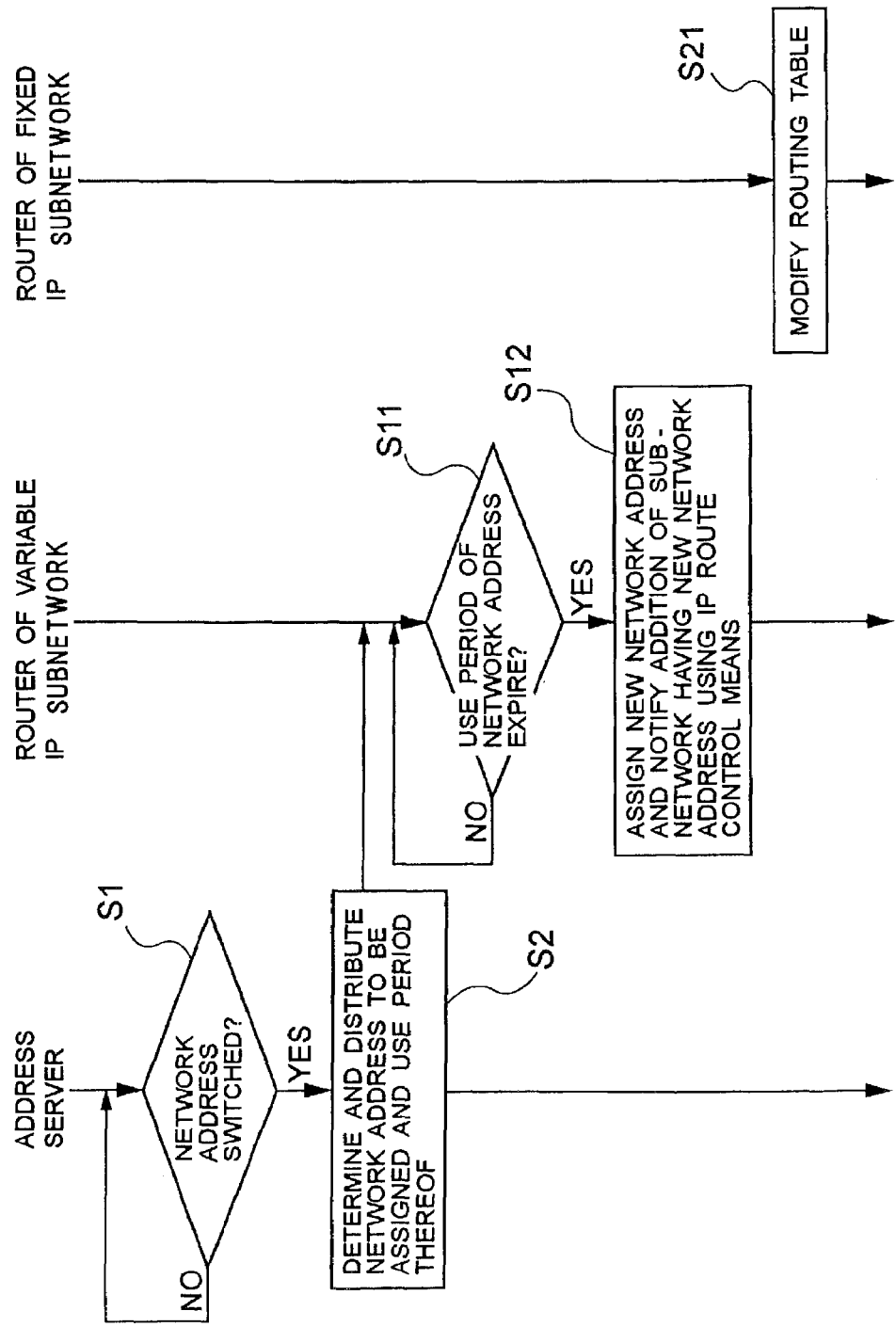
FIG. 2 is a flowchart showing an updating procedure of a network address of one embodiment of the mobile communication network system according to the present invention.

FIG. 2 is a flowchart showing variation procedure of a network address of one embodiment of the mobile communication network system according to the present invention. With reference to FIGS. 1 and 2, procedure where the router having the foreign agent function, is placed in one of the variable IP subnetworks 31 to 3n, will be discussed.

The address server 6 determines network addresses and their user period for respective variable IP subnetworks 31 to 3n (step S1 of FIG. 2). These informations are distributed to the routers having foreign agent function in respective variable IP subnetworks (step S2 of FIG. 2). Transmission means at this time may be packet delivery using the network addresses assigned upon distribution, or, in the alternative, may be preliminarily set in memories of the routers, The routers having foreign agent function and placed in respective variable IP subnetworks 31 to 3n are responsive to elapsing of the use period of the assigned network addresses (step S11 of FIG. 2) to assign the new network address of own router and notifies addition of the subnetwork having the new network address to the fixed IP subnetworks 21 to 2n using IP route control means (second notifying means) (not shown) (step S12 of FIG. 2).

IP route control means to be used at this time may be means employing discrete IP routing protocol, such as RIP (Routing Information Protocol), OSPF (Open Shortest Path First) or the like, or in the alternative, may be means for concentrated control via a route information server.

In respective fixed IP subnetworks 21 to 2n, a routing table (not shown) is modified according to notice from the routers having the foreign agent function and placed in the variable IP subnetworks 31 to 3n (step S21 of FIG. 2).

The address server 6 determines the use period of the network address so that one variable IP subnetwork will have two network addresses for a given period upon switching of the network address, upon assigning the network addresses to respective variable IP subnetworks 31 to 3n.

Figure 3:
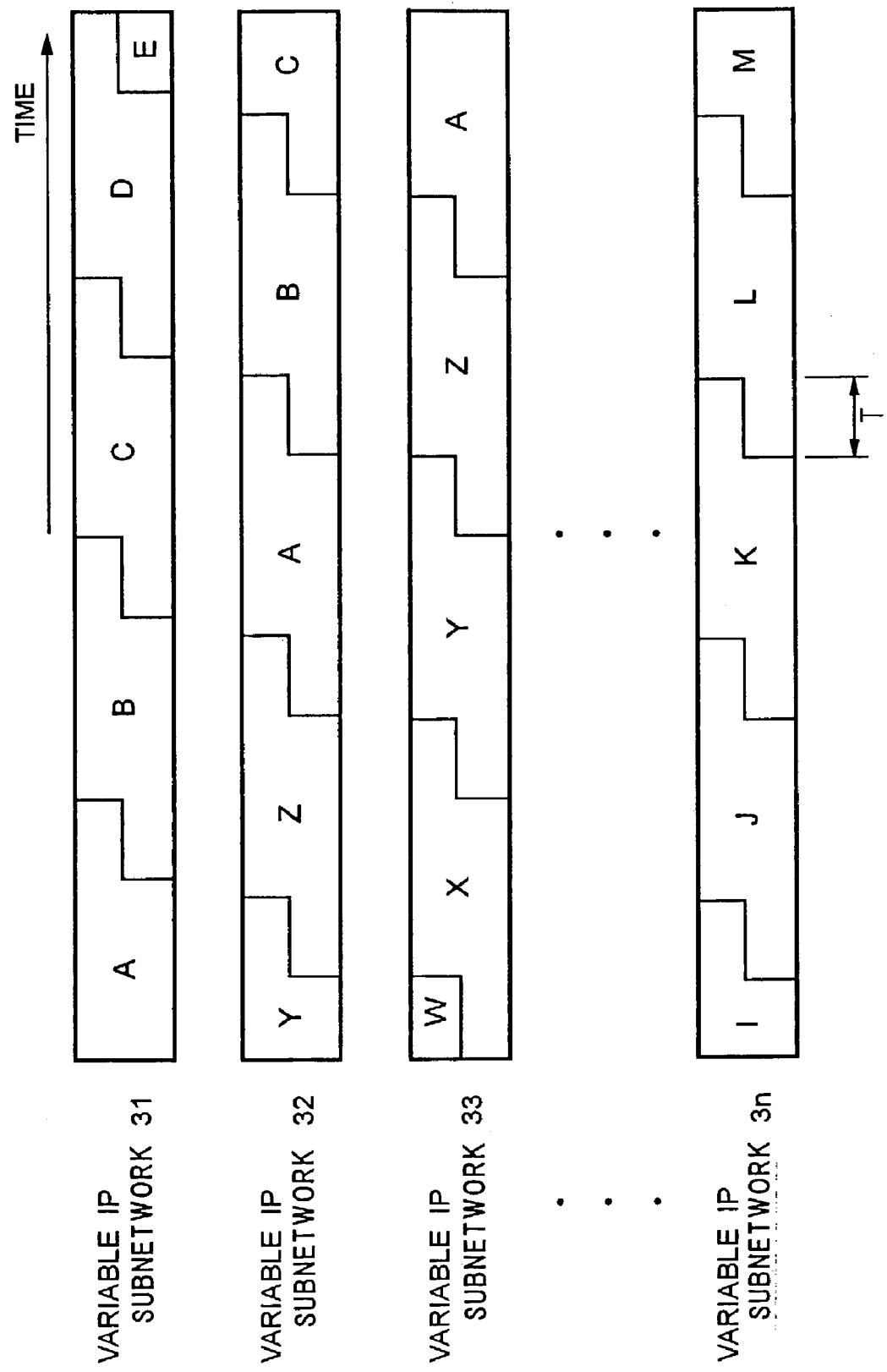
FIG. 3 is an illustration showing an example of address assignment by an address server of FIG. 1.

FIG. 3 is an illustration showing an example of address assignment by the address server 6 of FIG. 1. In FIG. 3, reference signs A to Z represent network addresses preliminarily obtained for assigning to the variable IP subnetworks 31 to 3n.

As shown in FIG. 3, the network addresses to be assigned to respective variable IP subnetworks 31 to 3n are switched from time to time. Upon switching of network addresses, two network addresses are assigned to the variable IP subnetworks 31 to 3n for a given switching period T.

The switching period T is set at a maximum period required so that the new network address is announced to the corresponding variable IP subnetworks 31 to 3n by first announcement means (not shown), in response to this, the mobile IP terminals in the variable IP subnetworks 31 to 3n notify variation of the presenting subnetwork to respective home agents and communication counterparts, and delivery of the packets transmitted from the communication counterpart is completed until the subnetwork of the packet transfer destination is switched in response.

In FIG. 3, the variable IP subnetwork 31 is switched the network address in sequential order of "A"→"B"→"C"→"D"→"E". Upon switching of the network address, "A" and "B", "B" and "C", "C" and "D", and "D" and "E" are assigned to the variable IP subnetwork 31 in overlapping manner for a given switching period T.

The variable IP subnetwork 32 is switched the network address in sequential order of "Y"→"Z"→"A"→"B"→"C". Upon switching of the network address, "Y" and "Z", "Z" and "A", "A" and "B", and "B" and "C" are assigned to the variable IP subnetwork 32 in overlapping manner for a given switching period T.

The variable IP subnetwork 33 is switched the network address in sequential order of "W"→"X"→"Y"→"Z"→"A". Upon switching of the network address, "W" and "X", "X" and "Y", "Y" and "Z", and "Z" and "A" are assigned to the variable IP subnetwork 33 in overlapping manner for a given switching period T.

Similarly, the variable IP subnetwork 3n is switched the network address in sequential order of "I"→"J"→"K"→"L"→"M". Upon switching of the network address, "I" and "J", "J" and "K", "K" and "L", and "L" and "M" are assigned to the variable IP subnetwork 3n in overlapping manner for a given switching period T.

Figure 4:
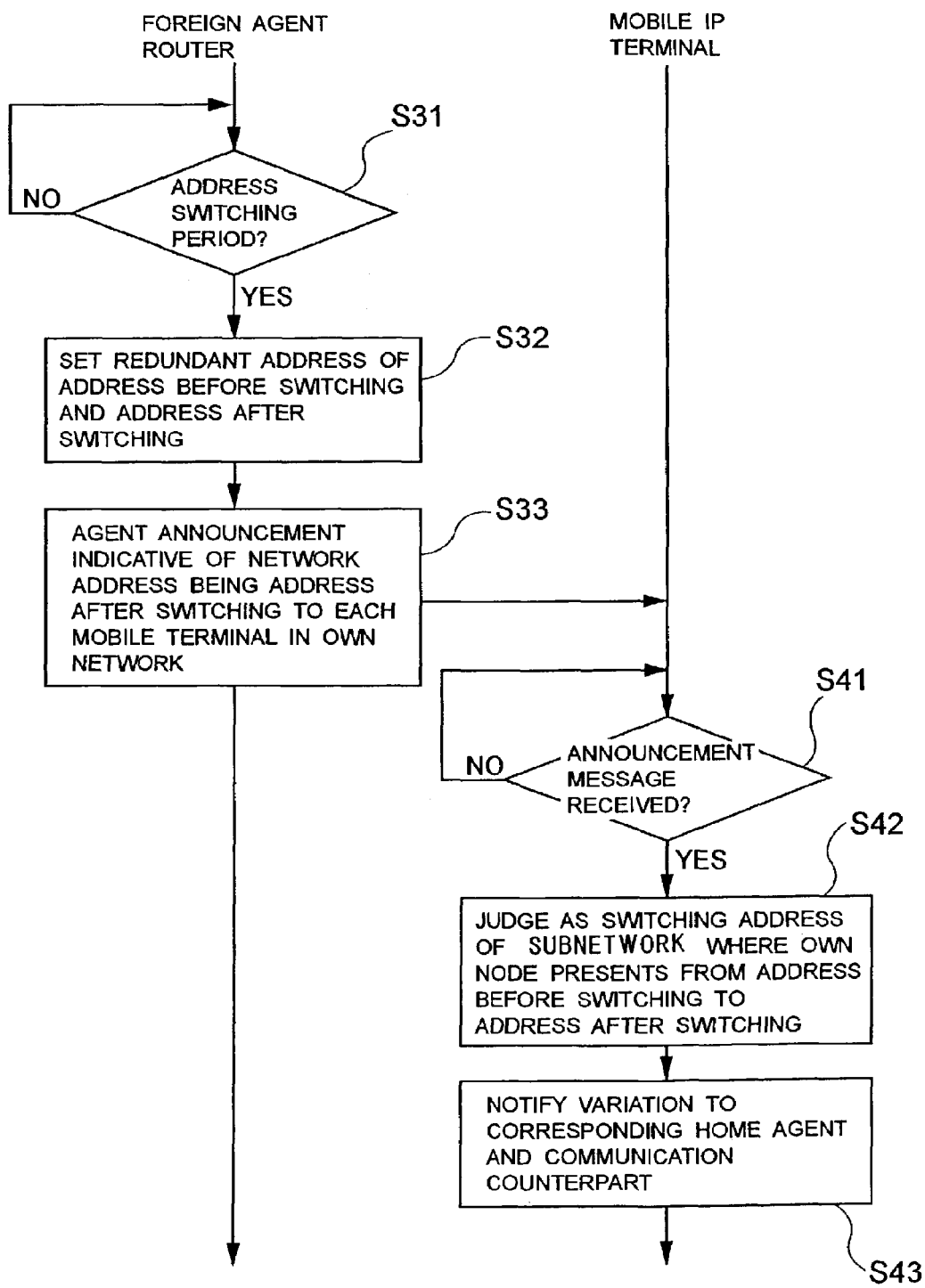
FIG. 4 is a flowchart showing operations of a foreign agent router in a variable IP subnetwork and a mobile IP terminal presenting in a zone.
Figure 5:
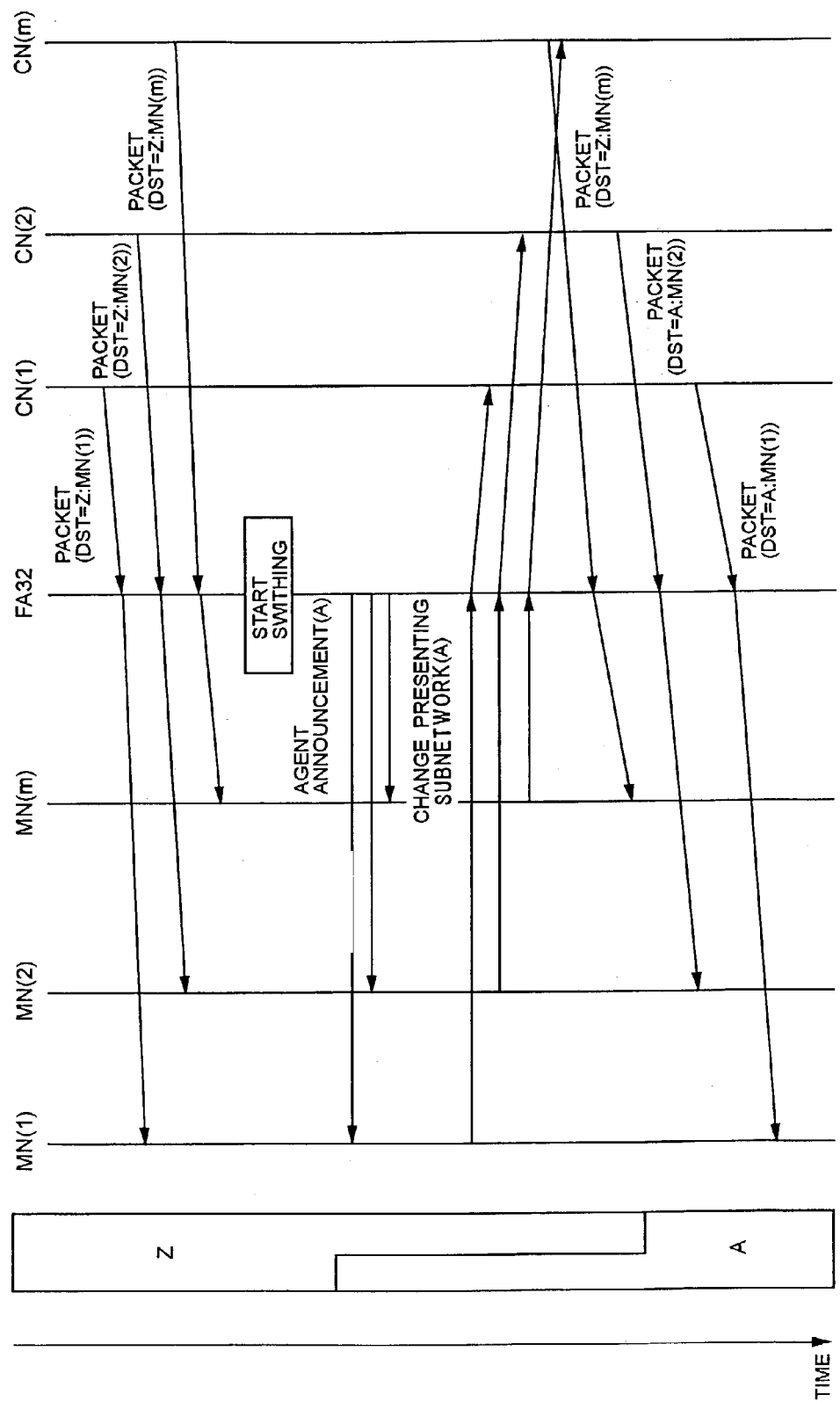
FIG. 5 is a sequence chart showing operation of one embodiment of the mobile communication network system according to the present invention.
Figure 6:
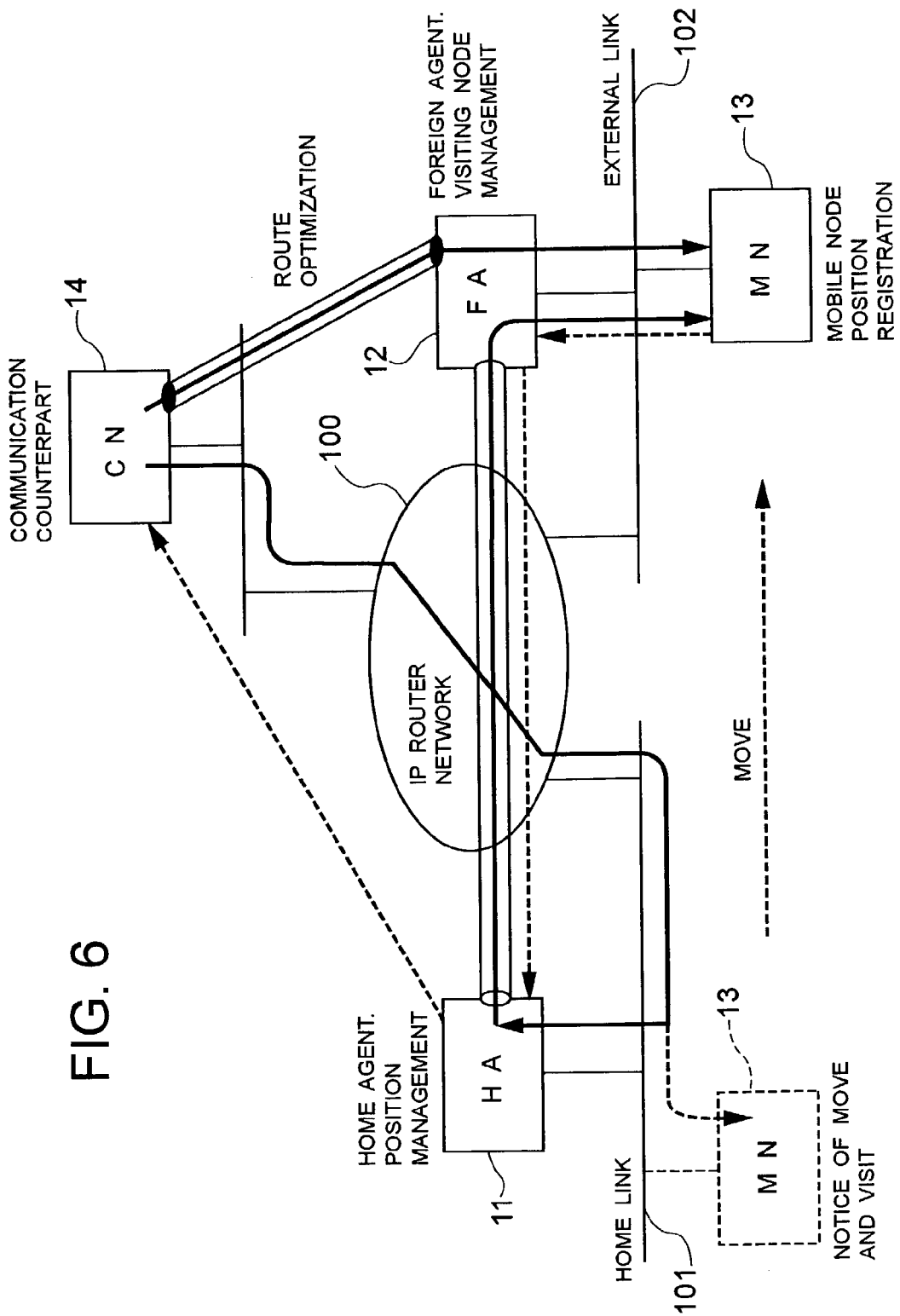
FIG. 6 is a block diagram showing one example of a construction of the conventional mobile communication network system.
Figure 7:
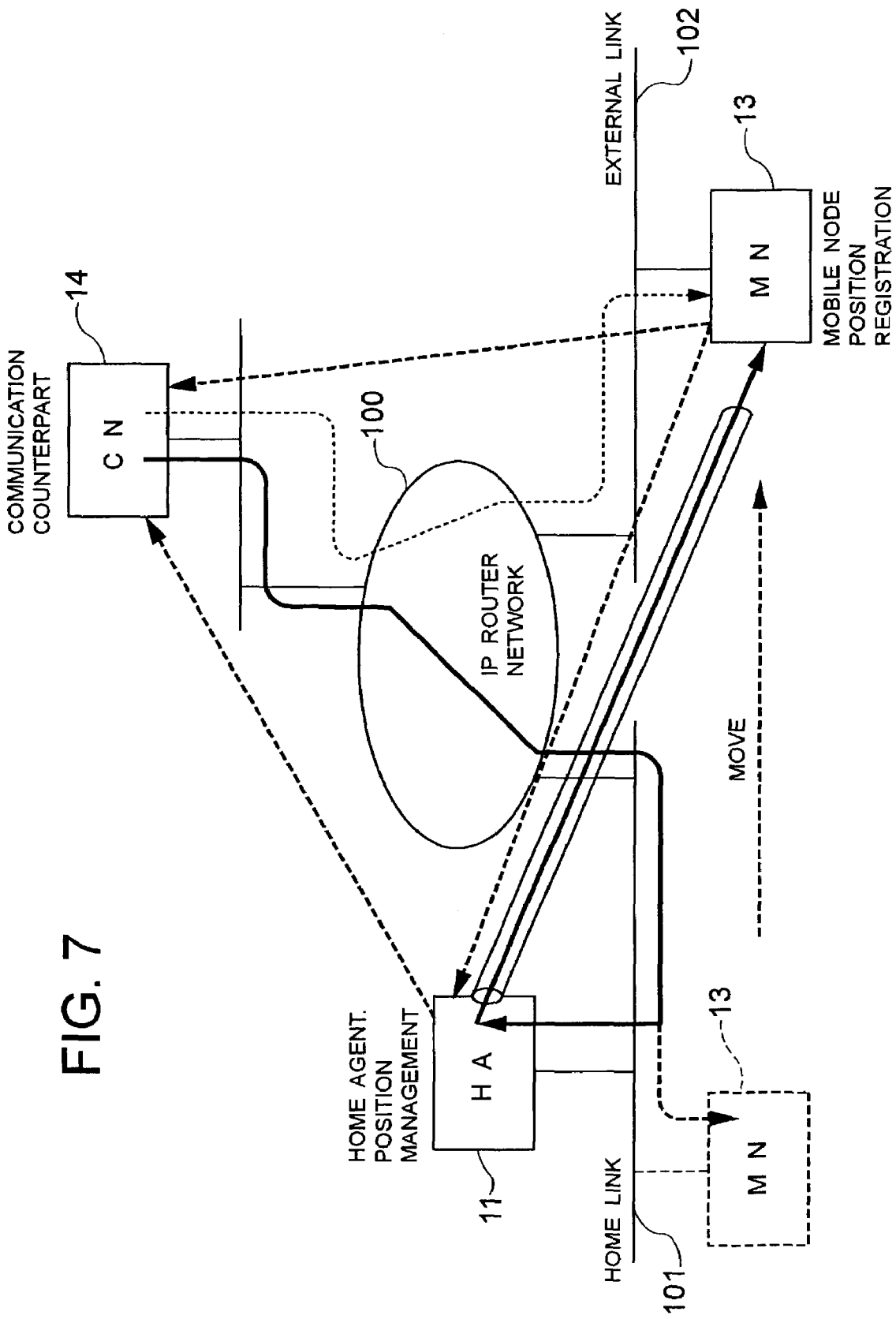
FIG. 7 is a block diagram showing another example of a construction of the conventional mobile communication network system.

FIG. 4 is a flowchart showing operation of the foreign agent router in the variable IP subnetworks 31 to 3n and the mobile IP terminal 51 presenting in the subnetwork, and FIG. 5 is a sequence chart showing operation of one embodiment of the mobile communication network system according to the present invention. Operation of one embodiment of the mobile communication network system according to the present invention will be discussed with reference to FIGS. 1 to 5.

In FIG. 5, operation upon switching the network address of the variable IP subnetwork 32 from "Z" to "A" through the given switching period T, in which network addresses overlap. In FIG. 5, FA32 denotes the foreign agent router of the variable IP subnetwork 32, MN(1) to MN(m) denote mobile IP terminals presenting in the variable IP subnetwork 32, and CN(1) to CN(m) denote communication counterparts feeding packets to the mobile IP terminals MN(1) to MN(m).

It should be noted that an expression "DST=X:MN(k)" in FIG. 5 represents that a final destination of the packet is the mobile IP terminal MN(k), and the network address of the foreign agent relaying the packet is X.

Before switching of the network address, the communication counterparts CN(1) to CM(m) feed packet with adding header indicating the network address "Z" identifying the foreign agent router FA32 on the mobile IP protocol upon feeding packet to respective mobile IP terminals MN(1) to MN(m). Feeding of packet is continued until reception of notice of variation of the presenting subnetwork of respectively corresponding mobile IP terminals.

When the address switching period designated in the foreign agent router FA32 expires (step S31 of FIG. 4), the foreign agent router FA32 sets the address of own router as redundant addresses of the address "Z" before switching and the address "A" after switching (step S32 of FIG. 4), and issues an agent announcement indicating that the network address is address "A" after switching for respective mobile IP terminals MN(1) to MN(m) within the variable IP subnetwork 32 by the first announcement means (step S33 of FIG. 4).

Respective mobile IP terminals MN(1) to MN(m) in the variable IP subnetwork 32 are responsive to the announcement message (step S41 of FIG. 4) to make judgment the subnetwork, in which the own node presents, is switched from the address "Z" before switching to the address "A" after switching (step S42 of FIG. 4) and notify variation of the presenting subnetworks to corresponding home agents and the communication counterparts CN(1) to CN(m) through the foreign agent router FA32 (step S43 of FIG. 4).

By this, the communication counterpart CN(k) transmitting packet to Z:MN(k) is responsive to change of the subnetwork where the recipient terminal is present, to change the transmitting destination of the packet to A:MN (k).

As set forth, with the shown embodiment, since the network address of the subnetwork where the mobile terminal presents, can be varied in random manner, it make it quite difficult to reverse trace the location of the presenting subnetwork. Therefore, both of route optimizing function and privacy protection can be achieved.

As set forth above, the present invention can achieve both of route optimizing function and privacy protection by randomly varying the address of sub-net, performing router announcement after varying the route control information of the subnetwork upon notifying content of variation and redundantly holding the address before variation and the address after variation during a period where all of packets to be delivered using the address before variation are delivered in the subnetwork, in the mobile communication network system consisted of a plurality of subnetworks and applicable of mobile IP.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A mobile communication network system consisted of a plurality of subnetworks and applicable to mobile internet protocol, comprising:
    means for randomly varying addresses of said subnetworks;
    first announcement means provided in said plurality of subnetworks for announcing currently assigned addresses of respective own subnetworks to terminals included in own subnetworks; and
    second announcement means provided in said plurality of subnetworks for announcing currently assigned addresses of respective own subnetworks to adjacent routers,
    in said subnetwork, an address before variation and an address after variation being redundantly held until delivery of packets using the address before variation is completed.

2. A mobile communication network system as set forth in claim 1, wherein said plurality of subnetworks is consisted of a plurality of fixed internet protocol subnetworks and a plurality of variable internet protocol subnetworks.

3. A mobile communication network system as set forth in claim 2, wherein each of said plurality of fixed internet protocol subnetworks has home agents corresponding to mobile internet protocol terminals, and each of said plurality of variable internet protocol temporarily includes said mobile internet protocol terminals.

4. A mobile communication network system as set forth in claim 2, wherein said address before variation and said address after variation are redundantly held in a foreign agent router arranged in each of said plurality of variable internet protocol subnetworks until delivery of packets using the address before variation is completed.

5. A mobile communication network system as set forth in claim 4, wherein packet data to said mobile internet protocol terminal from a sender is delivered to said foreign agent router via said home agent.

6. A mobile communication network system as set forth in claim 1, wherein said second announcement means notifies said address to adjacent router by any one of discrete control process and concentric control process.

7. A foreign agent router arranged in each of subnetworks consisting of a mobile communication network system applicable to mobile internet protocol, comprising:
    first announcement means for announcing currently assigned address of own subnetwork to terminals included in own subnetwork; and
    second announcement means for announcing currently assigned address of own subnetwork to adjacent router, wherein an assigned address varies and wherein an assigned address before variation and an assigned address after variation is redundantly held until delivery of packets using the address before variation is completed.

8. A foreign agent router as set forth in claim 7, wherein said subnetworks are variable internet protocol subnetworks in the mobile communication network system consisted of fixed internet protocol subnetworks having home agents corresponding to mobile internet protocol terminals and variable internet protocol subnetworks temporarily including said mobile internet protocol terminals.

9. A foreign agent router as set forth in claim 8, wherein packet data to said mobile internet protocol terminal from a sender is delivered through the home agent.

10. A foreign agent router as set forth in claim 7, wherein said second announcement means notifies said currently assigned address to adjacent router by any one of discrete control process and concentric control process.

11. An address server connected to any one of a plurality of fixed internet protocol subnetworks in a mobile communication network system consisted of a plurality of fixed internet protocol subnetworks and a plurality of variable internet protocol networks and applicable to mobile internet protocol, comprising:
   varying means for randomly varying network addresses of said plurality of variable internet protocol subnetworks; and
   distributing means for distributing network addresses of said plurality of variable internet protocol subnetworks so that network addresses before variation and network addresses after variation are redundantly held until delivery of packets using the address before variation is completed.

12. An address server as set forth in claim 11, wherein said distributing means assigns two network addresses for relevant variable internet protocol subnetwork in a preliminarily set given switching period upon switching of said network addresses.

13. A packet delivery method in a mobile communication network system consisted of a plurality of subnetworks and applicable to mobile internet protocol, comprising: step of randomly varying addresses of said subnetworks;
   step of announcing currently assigned addresses of respective own subnetworks to terminals included in own subnetworks; and
   step of announcing currently assigned addresses of respective own subnetworks to adjacent routers, in said plurality of subnetworks, an address before variation and an address after variation being redundantly held until delivery of packets using the address before variation is completed.

14. A packet delivery method as set forth in claim 13, wherein said plurality of subnetworks is consisted of a plurality of fixed internet protocol subnetworks and a plurality of variable internet protocol subnetworks.

15. A packet delivery method as set forth in claim 14, wherein each of said plurality of fixed internet protocol subnetworks has home agents corresponding to mobile internet protocol terminals, and each of said plurality of variable internet protocol subnetworks temporarily includes said mobile internet protocol terminals.

16. A packet delivery method as set forth in claim 14, wherein said address before variation and said address after variation are redundantly held in a foreign agent router arranged in each of said plurality of variable internet protocol subnetworks until delivery of packets using the address before variation is completed.

17. A packet delivery method as set forth in claim 16, wherein packet data to said mobile internet protocol terminal from a sender is delivered to said foreign agent router via said home agent.

18. A packet delivery method as set forth in claim 13, wherein said step of notifying said address to adjacent router notifies the address to the adjacent router by any one of discrete control process and concentric control process.

* * * * *